United States Patent Office 2,904,556
Patented Sept. 15, 1959

2,904,556

PHTHALIDES

Donald D. Wheeler and David C. Young, Midland, Mich., assignors to The Dow Chemical Company, Midland, Mich., a corporation of Delaware No Drawing. Application August 6, 1958
Serial No. 753,414

7 Claims. (Cl. 260—343.3)

This invention is concerned with phthalides having the formula

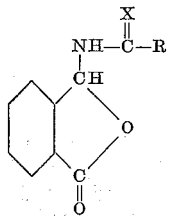

In this and succeeding formulae R represents hydrogen, alkyl containing from 1 to 17 carbon atoms, inclusive, alkenyl containing from 2 to 17 carbon atoms, inclusive, phenyl, lower-alkylphenyl, chlorophenyl, hydroxyphenyl, benzyl, chloro-lower-alkyl or carbamido-lower-alkyl; and X represents oxygen or sulfur. The expression "lower-alkyl" refers to alkyl radicals containing from 1 to 4 carbon atoms, inclusive. Representative alkyl radicals include isopropyl, ethyl, butyl, heptyl, nonyl, undecyl and heptadecyl. Representative alkenyl radicals include 8-heptadecenyl, 1-propenyl, vinyl and 1-pentenyl. Representative chloro-lower-alkyl radicals include chloromethyl, 1-chloroethyl, 1,1-dichloromethyl and 1-chlorobutyl. Representative carbamido-lower-alkyl radicals include 1-carbamidomethyl 2-carbamidoethyl and 3-carbamidopropyl. Representative lower-alkylphenyl radicals include o-tolyl, 4-isopropylphenyl and secondary-butylphenyl.

The new compounds are crystalline solids or viscous oils, somewhat soluble in polar organic solvents such as ethanol and acetone, and substantially insoluble in water and petroleum ether. These compounds have utility as insecticides and are particularly useful as nematocides.

The above compounds may be prepared by causing phthalaldehydic acid to react with an amide or thioamide having the structure

to produce the desired phthalide and water of reaction. The term "phthalaldehydic acid" and "3-hydroxyphthalides" refer to a compound having the structure

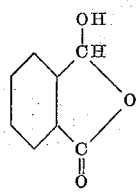

Phthalaldehydic acid is often represented in the literature as having the structure

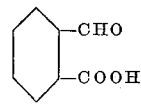

However, the acid employed in this invention and prepared as hereinafter described exists almost entirely in the 3-hydroxyphthalide ring structure, as indicated by its infrared absorption spectrum. Infrared data also indicate the phthalide products to have the ring structure.

In the synthesis good results are obtained when substantially equimolar proportions of the reactants are employed although the presence of a reasonable excess of either reactant does not interfere with the reaction. The reaction takes place smoothly in the temperature range of from 20° to 170° C. but a range of from 80° to 150° C. is considered preferable. After completion of the reaction, the water of reaction is removed by distillation and the product recovered as residue.

In a preferred method of carrying out the reaction, phthalaldehydic acid and an equivalent amount of the appropriate amide are mixed and heated for from 1 to 5 hours. As the heating proceeds, the product and water of reaction are formed. The latter may be allowed to reflux during the heating process or be distilled off. At the end of the heating period, the mixture is poured into water whereupon the product generally precipitates as a solid. The latter is recovered by filtration, washed with water and dried to obtain the desred phthalide product. The latter may be purified, if desired, by washing or recrystallization.

In certain cases, the phthalide product is a liquid. In this event the product is dissolved in benzene, the benzene solution heated to distill off first the water as a benzene-water azeotrope and then the remaining solvent, and to obtain the product as a residue.

Certain of the amide reactants herein employed have a tendency to polymerize under the conditions of reaction. Where this is the situation, inhibitors such as sodium nitrite and hydroquinone may be included in the reaction mixture.

The following examples illustrate the invention but are not to be construed as limiting.

*Example 1.—3-acetamidophthalide*

150 grams (1.0 mole) of phthalaldehydic acid and 59 grams (1.0 mole) of acetamide were mixed and heated at 120° C. for one-half hour. A reaction took place during the heating with the formation of a 3-acetamidophthalide product which formed a solid mass by the end of the heating period. The pressure on the system was reduced and the mixture heated to 130° C. to distill the water of reaction. The mixture was then allowed to cool and the product recovered as a solid residue. The latter, after washing successively with acetone and water and drying, melted at 218°–220° C. and was obtained in a yield of 137.5 grams or 72 percent of theoretical.

*Example 2.—3-benzamidophthalide*

60.6 grams (0.5 mole) of benzamide and 75.0 grams (0.5 mole) of phthalaldehydic acid were mixed and heated at about 150° C. for 2 hours to produce a 3-benzamidophthalide product and water of reaction, the latter refluxing as it formed. The pressure on the system was then reduced and the heating continued to distill off the water and to recover the product as a solid residue. The latter, after washing with water and recrystallization from acetone, melted at 175°–177° C. and was obtained in the amount of 112.5 grams or 89 percent of theoretical.

*Example 3.—3-(3-chlorobenzamido)phthalide*

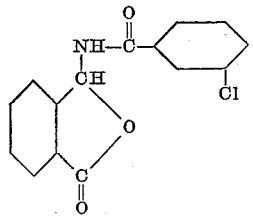

51.8 grams (0.333 mole) of m-chlorobenzamide, 50.0 grams (0.333 mole) of phthalaldehydic acid and 250 milliliters of methyl ethyl ketone were mixed together and the resulting solution heated for 2.5 hours. The solvent and water were then removed by distillaton and the residue poured into water whereupon a solid 3-(3-chlorobenzamido)phthalide product precipitated. The latter was separated by filtration and washed with acetone to recover a purified product melting from 206° to 209° C.

*Example 4.—3-salicylamidophthalide*

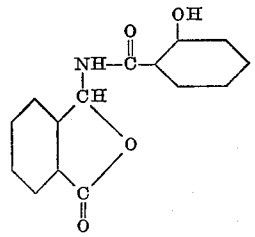

34.3 grams (0.25 mole) of salicylamide and 37.5 grams (0.25 mole) of phthalaldehydic acid were mixed and heated from 130° to 140° C. for 3 hours. During the heating a reaction took place with the formation of a 3-salicylamidophthalide product and water of reaction. The latter refluxed during the heating. After completion of the heating, the mixture was cooled to 90° C. and poured into 600 milliliters of water whereupon the product precipitated as a gum. The water was decanted therefrom and the product recrystallized from aqueous acetone. The resulting 3-salicylamidophthalide product melted at 175°–177° C.

*Example 5.—3-(decanamido)phthalide*

34.3 grams (0.24 mole) of decanamide and 36 grams (0.24 mole) of phthalaldehydic acid were mixed together and heated at 120° to 130° C. for 5 hours. A reaction took place during the heating with the formation of the water of reaction which refluxed in the mixture. Thereafter, the warm solution was mixed with 400 milliliters of warm water whereupon a solid 3-decanamidophthalide product precipitated. The latter was collected by filtration and, after washing with water and drying, melted at from 118° to 123° C. The yield amounted to 63 grams or 95.5 percent of theoretical.

*Example 6.—3-(2-phenylacetamido)phthalide*

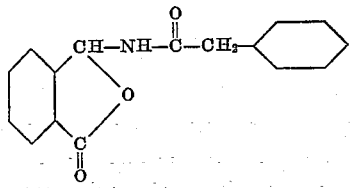

33.8 grams (0.25 mole) of 2-phenylacetamide and 37.5 grams (0.25 mole) of phthalaldehydic acid were mixed and heated at 120° to 140° C. for 15 minutes. The reaction mixture became a solid mass. The mixture was allowed to cool and hot acetone added thereto. The resulting mixture was filtered to obtain a 3-(2-phenylacetamido)phthalide product which, after washing with cold acetone, melted at 223°–225° C. The latter was obtained in a yield of 50 grams or 75 percent of theoretical.

*Example 7.—3-(2,2-dichlorobutyramido)phthalide*

15.6 grams (0.1 mole) of α,α-dichlorobutyramide and 15 grams (0.1 mole) of phthalaldehydic acid were mixed together and heated at 120° to 130° C. for 4 hours. A reaction took place during the heating with the formation of a 3-(2,2-dichlorobutyramido)phthalide product and water of reaction. The mixture was thereafter cooled and poured into 700 milliliters of water whereupon the product precipitated as an oil. The water was decanted from the oil. The residual oil solidified. The latter was washed with water and then recrystallized from acetone to recover the purified phthalide product melting at 169°–171° C.

*Example 8.—3-malonamdiophthalide*

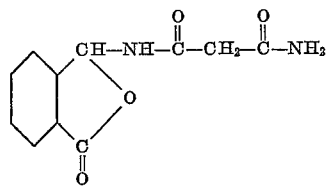

25.5 grams (0.25 mole) of malonamide, 37.5 grams (0.25 mole) of phthalaldehydic acid and 150 milliliters of water were mixed together and heated on the steam bath. The water was evaporated from the reaction mixture to obtain, as residue, a hard solid mass. The latter was broken into small pieces and washed repeatedly with water and acetone to obtain a 3-malonamidophthalide product melting at 260°–262° C. The latter was obtained in a yield of 80 grams or 90 percent of theoretical.

*Example 9.—3-thioacetamidophthalide*

25 grams (0.33 mole) of thioacetamide and 50 grams (0.33 mole) of phthalaldehydic acid were mixed together and heated in the temperature range of from 120° to 130° C. for 4 hours. During the course of the heating, a reaction took place with the formation of water of reaction which refluxed in the mixture. At the end of this period, the mixture was allowed to cool and solidified into a single mass. The product was broken up and washed with acetone to obtain the 3-thioacetamidophthalide as a crystalline material melting at 180°–182° C.

*Example 10.—3-(2-chloroacetamido)phthalide*

46.7 grams (0.5 mole) of 2-chloroacetamide and 75 grams (0.5 mole) of phthalaldehydic acid were mixed together and heated in the temperature range of from 130° to 140° C. for 5 hours. A reaction took place during the heating period with the formation of water of reaction which refluxed and the precipitation of some solid. The mixture was then cooled, washed with 700 milliliters of hot water, and then extracted with a mixture of benzene and methyl ethyl ketone. The organic solution was then distilled to remove the solvents and to recover a 3-(2-chloroacetamido)phthalide product having a refractive index, $n_D^{60°}$, of 1.563, as a dark amber viscous oil residue. The latter was obtained in a yield of 65 grams or 58 percent of theoretical.

*Example 11.—3-formamidophthalide*

22.5 grams (0.5 mole) of formamide and 75 grams (0.5 mole) of phthalaldehydic acid were mixed together and heated for 2 hours. During the heating, a reaction took place with the formation of a 3-formamidophthalide product and water of reaction. The latter refluxed during the heating. Thereafter, the pressure was reduced and the water removed by distillation. The remaining mixture was poured into 700 milliliters of water whereupon the product precipitated as an oil. The water was removed by decantation and the oil dissolved in benzene. The benzene solution was heated under reduced pressure to distill the benzene and to recover 77.5 grams or 88 percent yield of the desired phthalide product as a glassy solid melting at 55°–65° C.

*Example 12*

In preparations carried out in a similar manner, the following phthalides were prepared:

A 3-oleamidophthalide product melting at from 58° to 62° C. by the reaction of oleamide and phthalaldehydic acid.

A 3-adipamidophthalide product melting at 275°–280° C. by the reaction of adipamide and phthalaldehydic acid.

*Example 13.—3-thiobenzamidophthalide*

68.5 grams (0.5 mole) of thiobenzamide and 75.0 grams (0.5 mole) of phthalaldehydic acid are mixed together and heated to the reflux temperature of the water of reaction which is formed. Thereafter, the heating is continued for 2 hours. The pressure on the system is reduced to distill the water of reaction and to recover, as residue, a 3-thiobenzamidophthalide product. The latter is washed with water and acetone to obtain a purified product having a molecular weight of 269.

*Example 14*

In similar preparations the following phthalides are prepared.

3-thiopropionamidophthalide having a molecular weight of 221 by the reaction of thiopropionamide and phthalaldehydic acid.

3-(2-methylthiobenzamido)phthalide having a molecular weight of 283 by the reaction of 2-methylthiobenzamide and phthalaldehydic acid.

3-(4-methylthiobenzamido)phthalide having a molecular weight of 283 by the reaction of 4-methylthiobenzamide and phthalaldehydic acid.

3-thioformamidophthalide having a molecular weight of 193 by the reaction of thioformamide and phthalaldehydic acid.

3-linoleamidophthalide having a molecular weight of 411 by the reaction of linoleamide and phthalaldehydic acid.

3-thioheptamidophthalide having a molecular weight of 277 by the reaction of thioheptamide and phthalaldehydic acid.

3-sorbamidophthalide having a molecular weight of 245 by the reaction of sorbamide and phthalaldehydic acid.

3-(4-tertiary-butylthiobenzamido)phthalide having a molecular weight of 325 by the reaction of 4-tertiary-butylthiobenzamide and phthalaldehydic acid.

3-stearamidophthalide having a molecular weight of 415 by the reaction of stearamide and phthalaldehydic acid.

3-(4-chlorophenylacetamido)phthalide having a molecular weight of 302 by the reaction of 4-chlorophenylacetamide and phthalaldehydic acid.

3-(2-methylacrylamido)phthalide having a molecular weight of 217 by the reaciton of 2-methylacrylamide and phthalaldehydic acid.

The compounds of the present invention have utility in various agricultural applications such as for the control of nematodes and insects. They are also useful as toxic constituents in germicidal and fungicidal compositions. The utility of phthalides as nematocides is illustrated by a representative operation wherein good control of the larvae of the rootknot nematode (Meloidogyne species) was obtained when the organisms were contacted with an aqueous composition containing 10 parts of 3-benzamidophthalide product in a million parts of ultimate dispersion.

In another operation, substantially complete controls of American cockroaches (*Periplaneta americana*) were obtained when the insects were contacted with an aqueous composition containing 0.24 gram of 3-(2,2-dichlorobutyramido)phthalide per 100 milliliters of aqueous dispersion.

The antimicrobial property of the phthalide products is illustrated by a representative operation wherein a solid nutrient agar medium saturated with 3-(2-chloroacetamido)phthalide gave complete inhibition of growth when streaked with *Staphlococcus aureus* and incubated at 30° C. for three days.

The phthalaldehydic acid employed in this invention may be prepared by first photochlorinating o-xylene to obtain α,α,α,α',α'-pentachloro-o-xylene by passing chlorine gas into o-xylene while illuminating with sun lamps. The resulting chlorinated o-xylene may be heated with an aqueous constant boiling hydrochloric acid and ferric chloride solution to obtain phthalaldehydic acid as more fully disclosed in U.S. Patent 2,748,162.

This application is a continuation-in-part of our copending application Serial No. 597,101 filed July 11, 1956, now abandoned.

We claim:

1. A phthalide having the formula

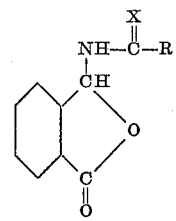

wherein R represents a member of the group consisting of hydrogen, alkyl containing from 1 to 17 carbon atoms, inclusive, alkenyl containing from 2 to 17 carbon atoms, inclusive, phenyl, lower-alkyl-phenyl, chlorophenyl, hydroxyphenyl, chloro-lower-alkyl, benzyl, and carbamido-lower-alkyl; and X represents a member of the group consisting of oxygen and sulfur.

2. 3-acetamidophthalide.
3. 3-benzamidophthalide.
4. 3-(3-chlorobenzamido)phthalide.
5. 3-(2,2-dichlorobutyramido)phthalide.
6. 3-(2-phenylacetamido)phthalide.
7. A method for preparing a phthalide having the formula

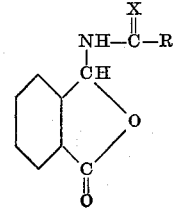

wherein R represents a member of the group consisting of hydrogen, alkyl containing from 1 to 17 carbon atoms, inclusive, alkenyl containing from 1 to 17 carbon atoms, inclusive, phenyl, lower-alkyl-phenyl, chlorophenyl, hydroxyphenyl, chloro-lower-alkyl, benzyl, and carbamido-lower-alkyl; and X represents a member of the group consisting of oxygen and sulfur, which comprises the step of heating phthalaldehydic acid and an appropriate amide having the formula, $$R\overset{X}{\underset{\|}{C}}-NH_2$$

wherein R and X are as above defined, at a temperature of from 20° to 170° C. for a time sufficient to complete the reaction.

No references cited.